US005508598A

United States Patent [19]
Al-Abassy

[11] Patent Number: 5,508,598
[45] Date of Patent: Apr. 16, 1996

[54] METHOD FOR QUICK CHARGING OF RECHARGEABLE BATTERIES

[76] Inventor: Issam Al-Abassy, Huttenbrennergasse 45, A-8010 Graz, Austria

[21] Appl. No.: 161,661

[22] Filed: Dec. 3, 1993

[30]    Foreign Application Priority Data

Jun. 5, 1991 [AT] Austria .................................. 1134/91

[51] Int. Cl.⁶ ....................................................... H02J 7/00
[52] U.S. Cl. .................................. 320/14; 320/39; 320/48
[58] Field of Search .................................. 320/14, 20, 23, 320/24

[56]                References Cited

U.S. PATENT DOCUMENTS

| | | | |
|---|---|---|---|
| 3,487,284 | 12/1969 | Cady | 320/20 |
| 3,559,025 | 1/1971 | Burkett et al. | 320/14 |
| 4,146,830 | 3/1979 | Foster | 320/23 |
| 4,270,080 | 5/1981 | Kostecki | 320/24 |
| 4,609,860 | 9/1986 | Fasen | 320/14 |
| 4,952,861 | 8/1990 | Horn | 320/23 |
| 5,148,096 | 9/1992 | Denzinger | 320/32 |
| 5,237,259 | 8/1993 | Sanpei | 320/23 |
| 5,307,000 | 4/1994 | Podrazhansky et al. | 320/14 |
| 5,329,219 | 7/1994 | Garrett | 320/22 |
| 5,367,244 | 11/1994 | Rose et al. | 320/23 |

*Primary Examiner*—Steven L. Stephan
*Assistant Examiner*—Nicholas Ponomarenko
*Attorney, Agent, or Firm*—Baker & Daniels

[57]                ABSTRACT

A device for quick charging of batteries, whereby the charging current of the battery is directed in constant current impulses. Several charging current strengths of varying strengths, are brought into effect, depending on the respective charging condition of the battery, by clock impulses. Assigned to each charging current strength is a battery-specific zone in the electrochemical voltage gradient $U=f(t)$, whereby the individual zones are indicated by voltage set values. The voltage zone assigned to each charging current strength is so chosen that in passing through this zone, no heating or gassing occurs. Thereby use is made of the fact that the battery at the beginning of the charging can accept a very high current. The charging condition of the battery is measured in each impulse pause, stored and compared with the voltage set value. Where there is a variance, the set-current value assigned to the zone is correspondingly adjusted.

10 Claims, 4 Drawing Sheets

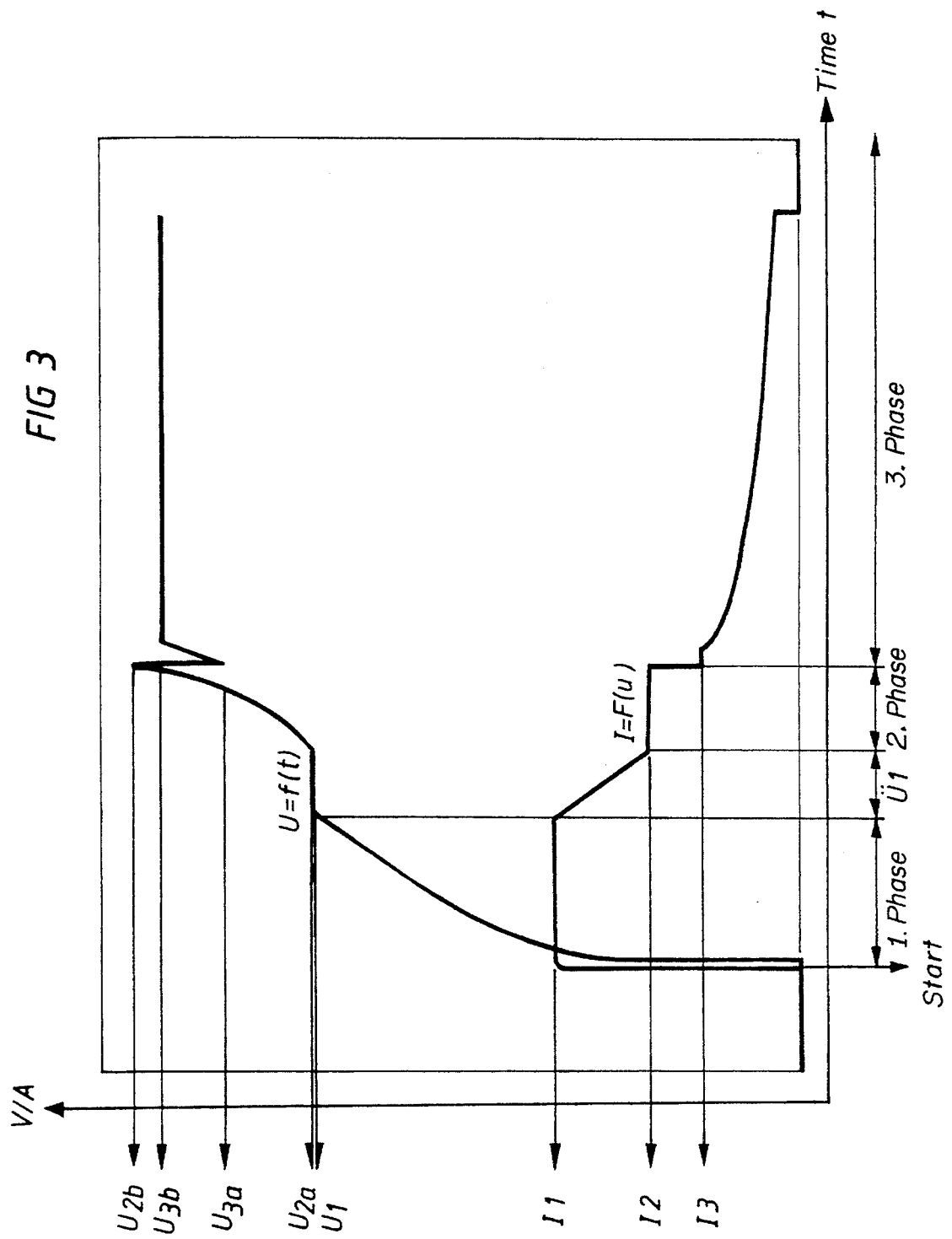

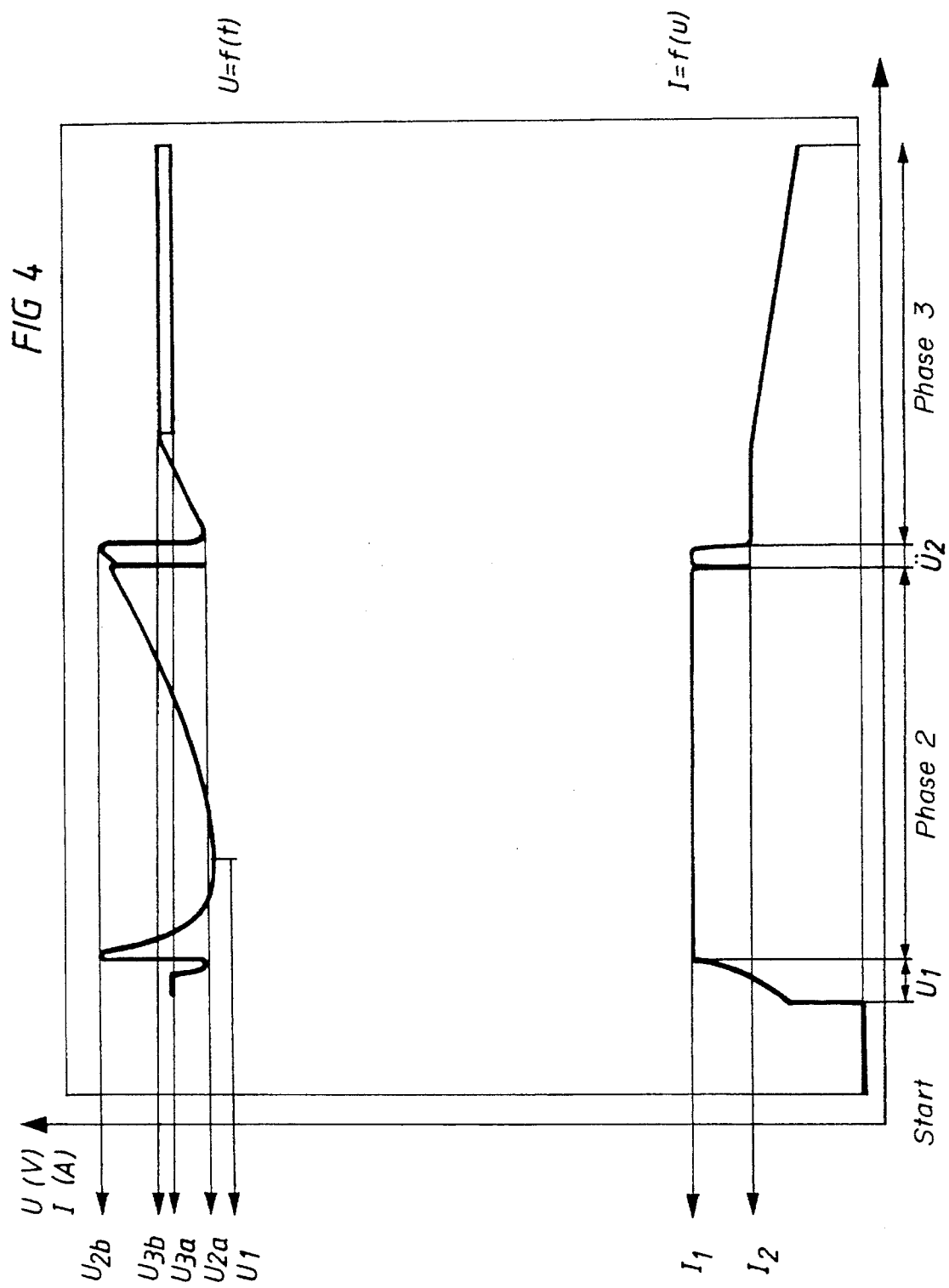

METHOD FOR QUICK CHARGING OF RECHARGEABLE BATTERIES

The invention concerns a method for quick charging rechargeable batteries and a circuit arrangement for implementation of the method.

The known charging devices work according to the principle that either a constant voltage or a constant current is produced, and a corresponding charging current or the voltage is applied to the battery. With the so-called constant-voltage charge, a constant charging voltage is applied to the battery and the current that at first is very high progressively decreases throughout the duration of the charging time. To assure that at the end of the charging, no undue warming of the battery occurs, the charging current is correspondingly limited. This means a very long charging time, in order to fully charge the battery. With the so-called constant-current charge, a constant current with a correspondingly high charging voltage is applied to the battery. When the maximum voltage is reached at the battery, the charging current is shut off. This maximum voltage consists of the electrochemical voltage (EMK) and the shut off value of a relay at the internal resistance of the battery, and results in the fact that the battery is not yet fully charged when shut off. If it is further charged despite this, the battery heats up and is thereby damaged. For these reasons, with known commercial charging devices, the charging current is limited to about 2 amperes, which necessitates charging times of between 12 and 24 hours.

However, there are also so-called quick charging devices, which recharge batteries in essentially a shorter time, for example, in one hour. In these devices, use is made of the fact that a fully discharged battery is able to initially accommodate a relatively high current. This applies especially to NiCd batteries, which have a slight internal resistance. if however the high charging current is not shut off at the right time, there is the danger that the battery so greatly overheats from overcharging, that gassing occurs, which can destroy the battery, or at least limit its service life.

Especially with quick charging devices of this sort, there is the problem of finding the correct shut off point for the charging current or charging voltage, since if it is shut off too early, the desired charge capacity is not reached. The charging time, the temperature and the clamp voltage are used as shut off criteria. The most exact are devices with a measurement of the clamp voltage, especially when the voltage is measured in the currentless condition of the battery. With known charging devices this is accomplished by measuring the voltage during short pauses in the charging. It is further known to feed the battery in constant current impulse, whereby the clamp voltage is measured and controlled during pauses in the current impulses.

With the known device of this sort, called a DeltaV-device, use ismade of the characteristic that the cell voltage is strongly dependent on the temperature of the battery, indeed such that as the temperature increases, the cell voltage decreases. With this known device it is therefore known that a considerable overcharge must be tolerated in order to maintain a short charging time and the desired temperature increase, in order that the voltage drop of the DeltaV can be recorded. The disadvantage there is that this voltage drop sets in earlier when the battery is charged with higher currents and with higher temperatures. In that case the battery is not fully charged. Furthermore, the gassing that occurs from the heating greatly limits the service life of the battery.

With another known device of this sort, the steep voltage increase at the end of the charging is used as a criterion whereby the charging current is not shut off, but rather, it is continuously withdrawn. Thereby a temperature increase toward the end of the charging process is effectively prevented. In this manner, batteries can be carefully charged, whereby a long service life and a high number of cycles can be guaranteed. Hereby the shortest charging time for a battery of 1–2 Ah is claimed as 10 minutes. Also, charging can occur in a temperature region of −10 to +60 ° degrees Celsius.

It is an object of the invention to provide a new charging device, with which shorter charging times are achieved and charging can occur in a broader temperature range, without harmful heating and subsequent tendency for gassing. Above all, the charging device is universally applicable for all commercial battery types and sizes, especially also for quick charging of motor vehicles.

The present invention in any case begins with a charging device with which the charging current of the battery is supplied in the form of a constant value current impulses, whereby in the pauses of the current impulses, the clamp voltage of the battery is measured and in reaching the previously determined maximum shut off voltage, the charging current is so diminished, that no harmful heating of the battery occurs.

The device according to the present invention is characterized in that several charging currents of varying strengths are provided which are put into effect depending on the respective charging condition of the battery, and that the respective charging condition is registered by measuring the electrochemical voltages (EMK) at the electrodes of the battery.

This can be thereby achieved because each charging current intensity corresponds to a battery-specific region in the electrochemical voltage gradient of the battery, in such manner that in overreaching the upper regional limits, a shut off of the respective charging current and likewise a turning on of the connecting region ensues, while underreaching the lower regional limits restores power of the respective charging current (Hysteresis production). In contrast to the known charging devices, with which the battery is impressed from outside currents and voltages, in the device of the invention, the battery is offered varying voltages and currents among which it can select those which, when cycling through this region, casues no noteworthy heating and/or gassing.

According to another characteristic of the invention, during the charging process, the decrease of the electrochemical voltage that normally occurs during each pause in the current impulses is strengthened in the current impulse pauses, by means of a targeted discharge process in a battery that is not fully charged. The discharging process in the current impulse pauses is strengthened by means of switching on an ohmic resister, preferably of the value of 10 to 10,000 ohms. By means of this short term discharging within the current impulse pause, the actual electrochemical voltage is more quickly reached. Furthermore, by means of these measures a battery specific crystal build up in the battery is prevented, which is known as the so-called "memory effect". As is well known, this effect reduces the capacity of a battery and its possible cell count.

It has been shown that, with the device according to the invention, the charging period can be reduced to five to seven minutes. Furthermore, it can be used with temperatures between −20° and +80° degrees Celsius.

Since in a fraction of a second, charging, measuring and correcting occurs, charging is very careful, despite the initially very high efficiency, because the charging current is completely received by the battery and not converted into heat.

In order to enable an especially careful charging, the number of zones can be increased as desired and the high current zone can be moved to second rather than first place, or omitted altogether. It is consequently especially suited to charging a battery over a photo-voltaic.

Naturally, the device according to the invention can be used for charging battery packs; for this use, the corresponding parameters need only be altered or adapted.

BRIEF DESCRIPTION OF THE INDIVIDUAL FIGURES OF THE DRAWINGS

FIGS. 1, and 1a–1c are theoretical voltage and current gradient of a commercial, rechargeable NiCd battery.

FIG. 2, a modular mimic display of a circuit arrangement for implementing the device according to the invention.

FIG. 3 is the actual voltage and current path at 50° degrees C. operating temperature at the beginning of the charging.

FIG. 4 is the actual voltage and current path at 0° C. operating temperature at the beginning of the charging.

Figure 1:
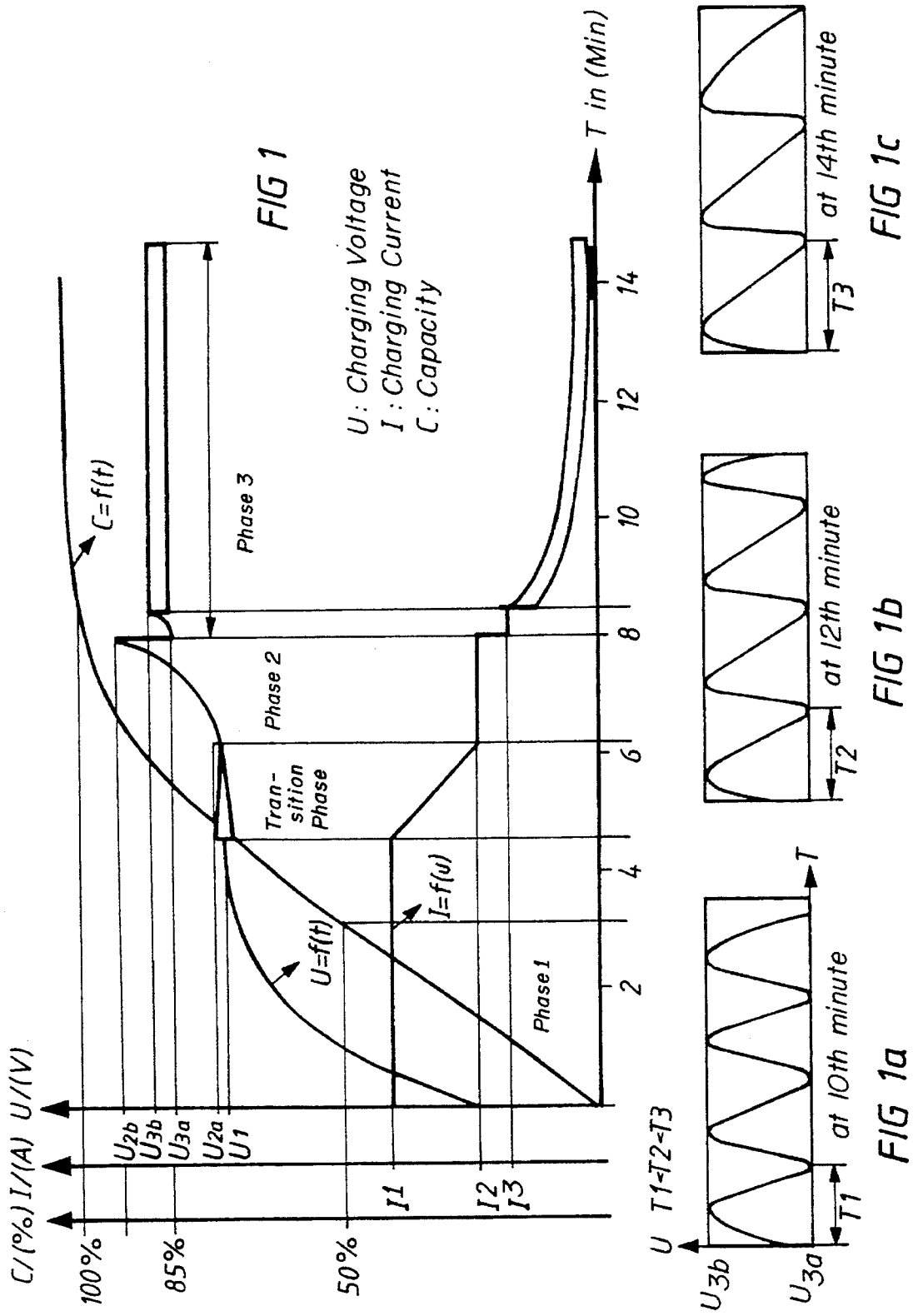

FIG. 1 shows the typical charging flow in a commercial Ni/Cd battery. The electrochemical voltage path (EMK) of the battery is indicated by $U=f(t)$ and the clock-pulsed charging current is indicated with $I=f(u)$. As can be seen, three different high, constant charging currents I1, I2 and I3 are provided. The choice of the height of the charging current depends on the battery to be charged. Thereby, use is made of the fact that a completely discharged battery can accommodate a very high current at the beginning of the charging. This current can maximally lie in the dimension of the short circuit current. With the chosen example, the currents amount to I1=10A, I2=6A, and I3=4A. To each of these currents is assigned a battery specific zone (phases 1 to 3) in the electrochemical voltage path $U=f(t)$, whereby each zone is indicated by a lower and upper voltage. The zone of phase 1 starts practically at 0 with a completely discharged battery and ends with the set value-voltage U1. To this joins phase 2, with the lower set value-voltage U2$a$, which scarcely differs from U1. As will be more closely illustrated below, the passage from phase 1 to phase 2 is not for the most part accomplished steadily, but rather in steps, so that a passage phase 1 is formed, in which current I7 as well as current I2 alternately come into effect. This behavior is more closely illustrated by FIG. 2.

As will be seen in the chosen example, the zone of phase 2 ends when reaching the maximum voltage value of U2$b$, where the current I1 of phase 2 is shut off and the current I3 of the compensation charge comes into effect. This zone is indicated by the lower set value-voltage U3$a$ and the upper set value-voltage U3$b$. The compensation charge practically starts only when the measured voltage of the battery—after shutting off current I2—has lowered to the set value-voltage U3$a$ of phase 3; that is, the battery was not fully penetrated with the charge. In so far as the charging current I3 extends, in order to achieve the set value-voltage U3$b$, the charging current I3 is shut off and turned on again, when the voltage of the battery again sinks to the set value-voltage U3$a$. The hatched region in phase 3 in the voltage path $U=f(t)$ means that the current I3 is turned on and off corresponding to the hysteresis formed by the voltages U3$a$ and U3$b$. As FIGS. 1$a$ to 1$c$ show, the voltage of the battery oscillates between the values U3$a$ and U3$b$, whereby the switching periods in the course of the charging time continuously increase. The hatched region in the current path $I=f(U)$ shows that the current I3 of the compensation charge diminishes with increasing charging time, as a consequence to the later illustrated impulse duration control of the charging impulse of the clock-impulsed charging current I3.

In so far as the charging current I3 is not sufficient to attain the set value-voltage U3$b$, the voltage of a battery not fully penetrated with charge can sink so far that the set value-voltage U2$a$ is reached, which results in the charging current I2 of the phase 2 again coming into effect and the battery is now charged with the higher current I2. As soon as the set value voltage U2$b$ is again reached, it is switched over—as before—to the compensation charge. This can be repeated many times. In this manner a transition region can also result within phase 2.

The transition phase 1 results when, in the course of charging the electrochemical voltage after reaching the zone of phase 1, which is indicated by set value voltage U1, incomplete charge penetration of the battery falls below the set value voltage U1, which results in charging current I1 again becoming effective and the charging current being shut off. The higher charging current I1 raises the battery voltage within the duration of the impulse again over the set value voltage U1, which again effects a shut off of the charging current I1 and start up of charging current 2 (I2). If it is discovered in the following impulse pause that the voltage U1 has fallen, the process repeats itself. This continues as long as the battery voltage within the impulse pauses no longer falls below the set value voltage U1.

Within the transition phase the charging current impulses consist of two current strengths, so that after averaging, the charging current steadily decreases, as the transition phase in FIG. 1 shows.

When, for example, a partially discharged battery should be recharged, phase 1 is omitted and the charging is begun in phase 2. If by accident a completely charged battery is set into a device that works according to the invention, then phases 1 and 2 are bypassed in a fraction of a second, and the battery passes immediately to stopping phase 3.

With the assistance of light diodes or other optical displays the capacity condition of the battery can be thereby relatively easily noticed, since the zone-recognizing voltage set values U1, U2$a$, U3$a$, U3$b$ and U2$b$ are displayed.

Figure 2:
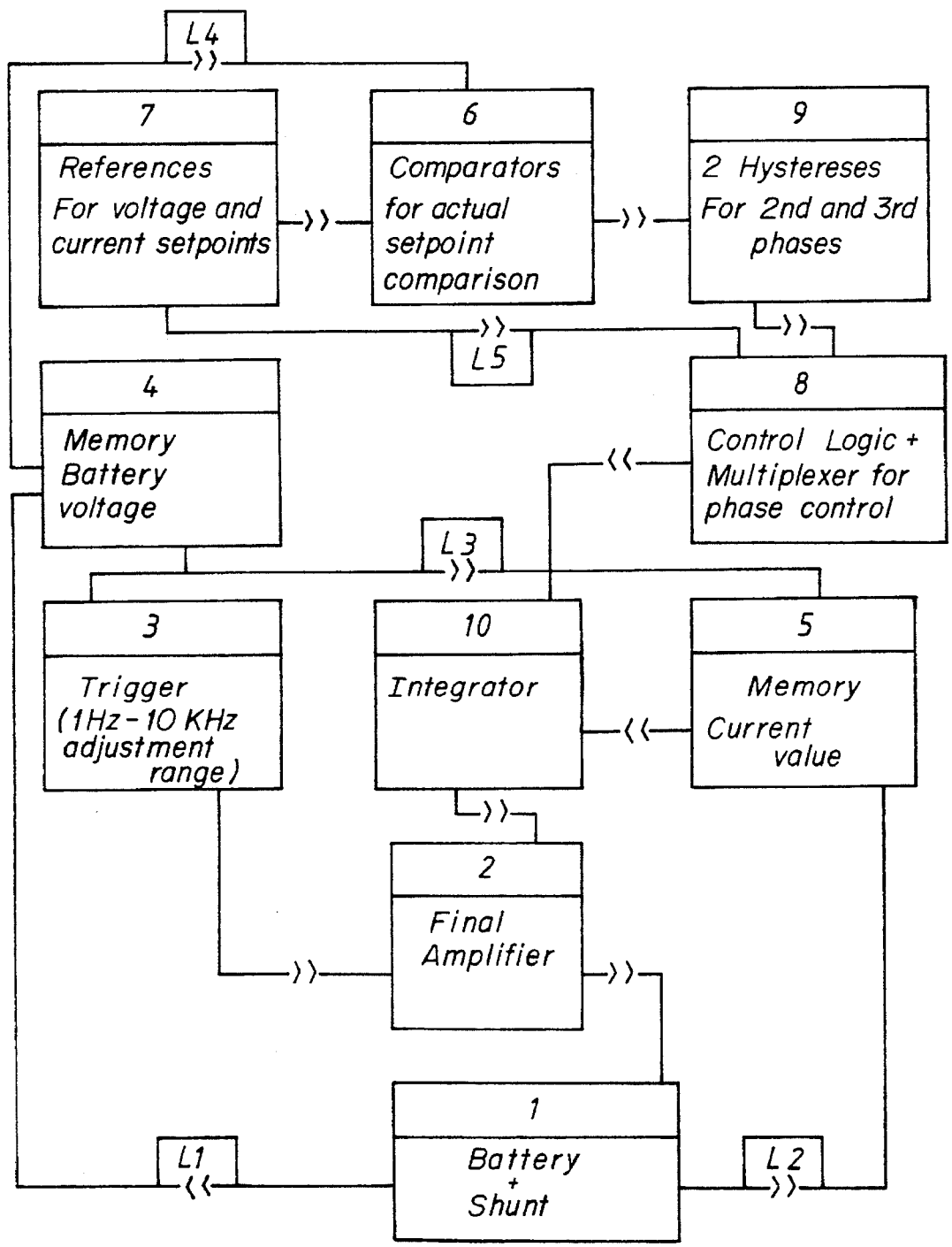

FIG. 2 shows a modular mimic display of a circuit arrangement for implementing the charging gradient presented in FIG. 1. Also indicated is a battery which is to be charged. The respective charging current demanded by the battery is fed to it in clock impulses by means of an output amplifier 2, which is controlled by a trigger 3, so that constant current impulse are delivered. The clock frequency is dialed high, so that the battery can be very carefully charged. The clock frequency can lie between 1 Hz and 10 kHz and is preferably adjustable; also adjustable is the break-make ratio of the clock frequency, for example between 5:1 and 100:1, that is, the impulse duration is 5 to 100 times as long as the impulse pause. As mentioned at the beginning hereinabove, in each current impulse pause, the electrochemical voltage (EMK) of the battery, which represents the charging condition, is measured and conducted by a conductor L1 to a voltage reservoir 4 as a voltage actual value. It is stored there until the next measured value arrives out of the following impulse pause. The reservoir 4 is therefore consecutively corrected in the last position.

In similar manner the respective current real value is directed over a conductor L2 to a current real value reservoir 5 and stored there until the next current real value of the next current supplying phase arrives. To record the current real value a shunt is used on which is calipered a voltage proportioned to the current, the voltage being directed as voltage value to the current real value reservoir 5. Since the voltage real value reservoir 4 and the current real value reservoir 5 run synchronized with the output amplifier 2, both of the reservoirs 4 and 5 are alternately directed over the conductor L3 by the trigger 3, that is the one in the impulse pause and the other in phose directing thereto. The voltage real value comparator 6, in the voltage real value reservoir 4, is directed through a conductor L4 to the set value-real value comparison. The voltage and current set values necessary for the device are included in the small box 7.

The present current and voltage set values in the form of voltages are preferably produced in a simple manner with the aid of voltage distributors provided with constant voltages.

The voltage set values are directed to the comparator 6, whereby the count of the comparator corresponds to the count of the voltage to be recorded. The voltage real value is offered to all of the comparators. The exits of the individual comparators are directed to a RS-flip-flop combination 9, which selects the individual zones (phases 1 to 3), in such manner that both the hysteresis 2 and 3 are formed.

Corresponding to the example presented in FIG. 1, the hysteresis 2 is formed by the two set value voltages U2a and U2b and the other hysteresis 3 is formed by the voltage set values U3a and U3b in such a manner that with the voltage build-up of the electrochemical voltage of the battery form U2a or U3a to U2b or U3b, the corresponding charging current I2 or I3 remains turned on, while on the other hand with the lowering of the battery voltage from U2b or U3b to U2a or U3a, the current I2 or I3 corresponding to this zone (phase 2 or phase 3) remains shut off.

The current set values corresponding to the individual phases are transmitted through a conductor L5 to a control logic 8. The flip-flops of the RS-combination 9 preferably give digital signals to the control logic 8 in order to inform it in which phase one already finds oneself. The control logic 8 contains a multiplexer for phase control in order to establish a corresponding coupling between the phases 2 and 3 with the coordinating charging currents I2 and I3. At the exit of the control logic 8 there appears consequently the current set value demanded by the battery, which set value is directed to an integrator 10. The integrator 10 compares and corrects the current set value prepared by the control logic with the current real value stored in the current real value reservoir 5.

By way of the preferably multistage output amplifier, the integrator 10 controls the maximum allowable charging current demanded by the battery. Since the output amplifier 2 is preferably clock-pulsed by way of a preamplification stage, there result exact current impulses, which in the transition phase consist of two current strengths, for example, in the transition phase 1, of the currents I1 and I2, whereby the impulse duration remains constant.

The adaptability of such a charging device to different battery types is possible in a simple fashion by merely inserting a potentiometer or the like. It could therefore be rightly identified as an "electrode specific charging device".

FIG. 3 and FIG. 4 show actual recorded current-voltage diagrams, whereby the current and voltage curves U=f(t) and I=f(u) were recorded with a battery temperature of 50° degrees C. or 0° degrees C. respectively. The height of the charging currents I1 to I3 and the height of the voltage set values U1, U2a U2b, and U3a and U3b are similarly chosen as in FIG. 1. As can be seen, the curve gradient in FIG. 3 practically corresponds to that in FIG. 1, with the exception of the charging time, which in FIG. 3 lies between 5 and 7 minutes.

Depending on the value of the temperature, the battery takes up little current as FIG. 4 shows, so that phase 1, after a short transition phase U1, immediately goes into phase 2 with the charging current I2. Since after reaching the maximum voltage set value U2b, the charging current I3 of the compensation charge is not sufficient, and in order to hold the voltage U3a, the charging current I2 is again switched on. In this manner the transition phase U2 results. Surprisingly and unexpectedly it has turned out that when inserting an alkaline primary cell into a device that operates according to the present invention, this also proves to be rechargeable without danger. Closer research into this phenomenon has shown that, for example, an alkalimanganese primary cell claimed a nonrechargable, was charged and discharged 50 times in a row and after the fiftieth time still had 75% of its claimed capacity. Certainly a quick recharging was not possible; the charging time took between 2 and 3 hours. Research has shown that this characteristic of rechargeability indicates quicksilver-quicksilver-oxide and silver-silveroxide primary cells and others. Understandably a battery-specific adjustment of the charging device was necessary.

The somewhat higher circuit-technical use of the device according to the invention vis-a-vis the known quick charging devices can, by means of a meaningful integration of electronic components, be limited to an integrated switching circuit. This is however always suitable where it is a question of an extremely short charging time, careful handling of the battery, an elevated number of cycles, and prevention and possible adjustment of memory behavior.

Protection against incorrectly inserting a battery in the charging device, can be thereby realized since in the supply line to the voltage and current supply of the device, a switching transistor is attached, which can only be controlled with correct polarity of the batter. As is known, a fully discharged battery still has an electrochemical resting voltage of about 0.6 volts, which after corresponding strengthening, is sufficient to direct the switching transistor in the input circuit. Since a very faulty battery, for example as a result of a short circuit between the electrodes of the battery, has no more resting voltage, such a one would be recognized by the aforementioned reverse battery protection and can be identified. The charging process is then not begun at all.

Finally, an additional device can be provided, for example, a sensor, in order to observe the temperature of the battery, which naturally is only meaningful when a battery is charged at a higher temperature, for example, over 60° degrees C.

I claim:

1. A method for quick charging a rechargeable battery such as in a motor vehicle, comprising the steps of:

feeding a charging current to the battery in the form of a constant value current impulses, wherein in reaching a maximum cutoff voltage said charging current is diminished whereby no harmful heating of the battery occurs;

during pauses of the current impulses, measuring an individual charging condition of the battery by measuring a respective clamp voltage of the battery;

wherein said charging current comprises a plurality of different strength charging currents which are brought into effect depending on the respective charging condition of the battery;

assigning each of said plurality of different strength charging currents a specific zone in an electrochemical potential gradient of the battery, wherein an overreaching of an upper zone limit of one zone leads to a shut off of its respective charging current and a turning on of the charging current of an adjoining zone:

in a transition phase, reducing said charging current fed to the battery from a first strength charging current of a first charging phase to a second strength charging current of a second charging phase when an electrochemical voltage of the battery reaches a first upper zone limit voltage of said first charging phase;

in said transition phase, increasing said charging current fed to the battery from said second strength charging current to said first strength charging current when the electrochemical voltage falls below said first upper zone limit voltage, whereby an average charging current fed to the battery in said transition phase is between said first strength charging current and said second strength charging current;

when said electrochemical voltage of the battery climbs above a lower zone limit voltage of said second charging phase, holding said charging current fed to the battery in said second phase on said second strength charging current; and if in said second phase a second charging phase upper zone limit voltage is reached, reducing said charging current fed to the battery to a third strength charging current in a third phase, fixing third phase lower and upper zone limit voltages, and by switching on and off said third strength charging current an average charging current to the battery in said third phase is further reduced.

2. The method of claim 1 further comprising the step of strengthening a lowering of the electrochemical voltage in a not yet fully charged battery which normally occurs in the charging process during each current impulse pause by a targeted discharging process in the current impulse pause.

3. The method of claim 2 wherein the discharging process is strengthened by switching on an ohmic resistor in the range of 10 ohms to 10,000 ohms 4. The method of claim 3 wherein said constant current impulses comprise an impulse pause ratio of between 5:1 and 100:1.

5. The method of claim 4 wherein said first strength charging current is set at a value of a short circuit current of the battery.

6. A switching arrangement for implementing the method of claim 5 further comprising:

means for measuring in each current impulse pause the electrochemical voltage of the battery;

means for storing the measured electrochemical voltage in a voltage real value reservoir;

comparator means for comparing the measured electrochemical voltage with voltage set values assigned to the individual zones;

joined with exits of said comparator means, an RS-flip-flop combination for assigning the respective voltage real value to the individual zones; and logic control means for joining the individual zones with assigned current set values whereby at an exit of said logic control means a current set value corresponding to the voltage real value appears.

7. The switching arrangement of claim 6 further comprising integrator means for directing the current set value delivered from said logic control means to an output amplifier that feeds the battery, wherein said integrator means compares a current real value with the respective current set value and resets it within the pulse duration.

8. The switching arrangement of claim 7 further comprising shunt means for measuring the current real value of a clock-impulsed charging current within the impulse duration, and means for storing the current real value in a current real value reservoir for the duration of the impulse.

9. The switching arrangement of claim 8 further comprising a trigger, wherein said output amplifier delivers the charging currents of different strengths and comprises a multistage amplifier, and wherein said output amplifier is clock-impulsed together with said voltage real value reservoir and said current set value reservoir by said trigger.

10. The switching arrangement of claim 9 further comprising voltage distributors fed by constant voltage sources, and wherein said voltage and current set values are calipered by said voltage distributors.

* * * * *